April 27, 1948.  W. L. DAWSON  2,440,248
OBJECT LOCATING APPARATUS
Original Filed Aug. 19, 1944
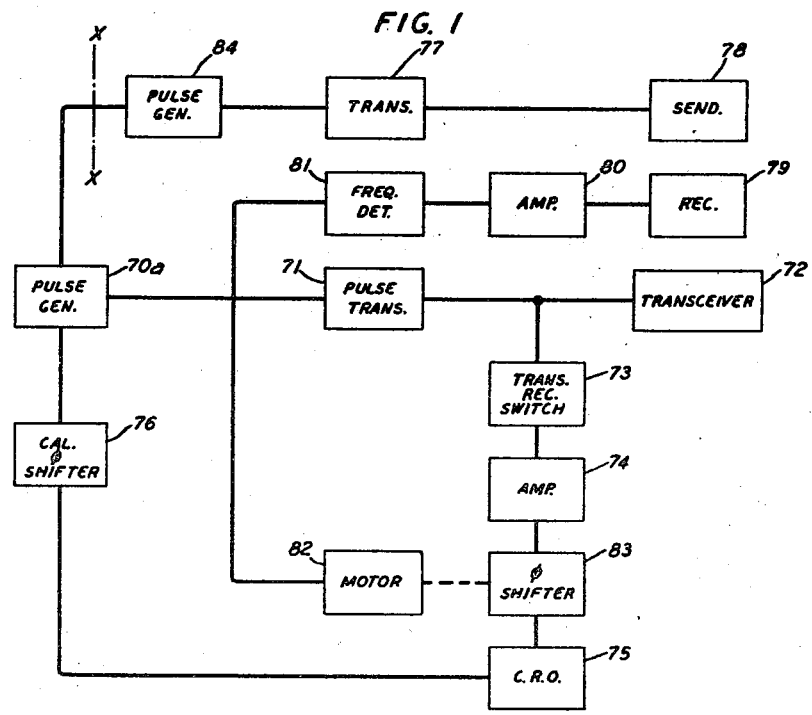
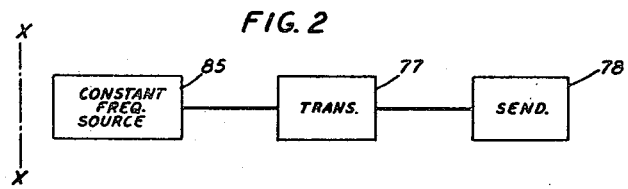
INVENTOR
W. L. DAWSON
BY
P. J. Rochz
ATTORNEY Patented Apr. 27, 1948

2,440,248

UNITED STATES PATENT OFFICE 2,440,248

OBJECT LOCATING APPARATUS

Wilfrid L. Dawson, New York, N. Y., assignor to Bell Telephone Laboratories, Incorporated, New York, N. Y., a corporation of New York Original application August 19, 1944, Serial No. 550,155. Divided and this application December 20, 1946, Serial No. 717,372

6 Claims. (Cl. 177—352)

This invention relates to an underwater echo ranging system, and more specifically to an arrangement for enabling such system to indicate the correct distance to a reflecting object at a given instant.

This application is a division of my application Serial No. 550,155, filed August 19, 1944, now abandoned.

In prior underwater echo ranging systems the distance to an object is usually determined by the travel time of a pulse wave from an observing point to a reflecting object and of the echo back to the observing point, when the velocity of the pulse wave is known. In the event of relative motion between the observing point and reflecting object, prior underwater echo ranging systems tend to furnish an incorrect indication of the distance between the observing point and reflecting object at a given instant. For example, let it be assumed that the velocity of the pulse wave is 4,000 feet per second in the water constituting the transmission medium for the pulse wave, the reflecting object is approaching the observing point at the rate of 100 feet per second, and the initial distance between the observing point and reflecting object is 4,100 feet. Upon the elapse of one second the distance between the observing point and reflecting object is 4,000 feet, and the pulse wave emitted at the observing point reaches the reflecting object in the one second. Upon the elapse of two seconds, the echo from the reflecting object is picked up at the observing point causing thereat a distance indication proportional to one-half of two seconds or 4,000 feet. But at end of the two seconds, the reflecting object is actually 3,900 feet from the observing point so that an error of 100 feet occurs at that instant in the distance indication at the observing point. Such error may be intolerable when the distance indication is to be used subsequently in a gun-directing mechanism.

The present invention contemplates an arrangement for causing an underwater echo ranging system to indicate a substantially correct distance to a reflecting object at a given instant.

The main object of the invention is to compensate for relative motion between an observing point and a reflecting object at a time subsequent to the production of a distance-determining echo at the reflecting object.

In accordance with a specific embodiment of the present invention as utilized with the signal pulse waves of the above-noted prior underwater echo ranging system, a compensating wave of a frequency different from that of the signal pulse waves is imparted to the water transmission medium between successive pulse waves by a special transmitter positioned at the observing point, and the echo of the compensating wave from the reflecting object is picked up by a tuned receiver located at the observing point, the transceiver of the echo ranging system per se being non-responsive to the compensating wave and its echo. The echo of the compensating wave is then translated into a direct-current voltage having a polarity depending on whether the reflecting object is moving toward or away from the observing point, and a magnitude depending on the extent of the frequency change in the compensating wave due to the amount of the relative motion between the observing point and reflecting object. This direct-current voltage is then utilized to vary the time delay of the echo of the pulse wave in the underwater echo ranging system and thereby compensate for the relative motion between the observing point and reflecting object. This tends to provide a substantially correct indication of the distance to the reflecting object at a given instant.

In a modification a compensating wave of constant and preselected frequency, which is different from that of the pulse wave of the underwater echo ranging system per se, is continuously transmitted into the water, and the echo of this compensating wave is picked up and thereafter translated into a direct-current voltage which is also utilized to vary the time delay of the echo of the pulse wave of the underwater echo ranging system in a manner similar to that previously indicated.

The invention will be readily understood from the following detailed description taken together with the accompanying drawing in which:

Fig. 1 is a box representation of a circuit arrangement of a specific embodiment of the invention utilized with a known type of underwater echo ranging system; and Fig. 2 is a modification of the invention that may be substituted in the circuit of Fig. 1.

Referring to Fig. 1, a known type of underwater echo ranging system includes a pulse generator 70a positioned at an observing point and supplies one portion of a signal pulse through a transmitter 71 embodying the desired amount of amplification to a tuned transceiver 72 which imparts the signal pulse to the water transmission medium. The echo from the reflecting object, whose distance relative to the observing point is to be ascertained, is picked up by the transceiver 72, and applied through a transmit-receiver switch 73, and amplifier 74 to a first pair of deflecting plates of a cathode ray oscilloscope 75 of conventional structure. This switch is arranged to render amplifier 74 inoperative during the sending of the signal pulses via the transceiver 72, but operative at all other times. A further portion of each signal pulse supplied by the generator 70a is also applied through a calibrated phase shifter 76 to another pair of deflecting plates of the oscilloscope 75. Indications of the echo and further portion of the signal pulse are displaced along the horizontal axis of the screen of the oscilloscope 75 to an extent depending on the time intervening between the transmission of the one portion of signal pulse and the reception of its echo. The calibrated phase shifter 76 is then actuated to bring the indication of the further portion of signal pulse into substantial coincidence with the echo indication on the screen of the oscilloscope 75. The calibration of the phase shifter 76 will provide a direct reading in desired units of the distance intervening between the observing point and reflecting object.

In accordance with a specific embodiment of the invention as shown in Fig. 1, a third portion of the signal pulse from the generator 70a is supplied to another pulse generator 84 which supplies its compensating pulse whose frequency is different from that of the pulse supplied by the generator 70a, through a tuned transmitter 77, including suitable amplification, to a tuned sending apparatus 78 whereby the compensating pulse is imparted to the water transmission medium. The third portion of the signal pulse from the generator 70a serves to block the compensating pulse generator 84 only during such time as the generator 70a is supplying signal pulses to the transceiver 72, otherwise the generator 84 is operative to transmit the compensating signal pulses during the time intervals between successive signal pulses transmitted from the generator 70a. The echo of the compensating pulse picked up by receiver 79 is supplied to amplifier 80, and thereafter is impressed on a suitable frequency detector 81.

This detector serves to produce a direct current voltage having a polarity depending on whether the frequency of the echo of the compensating pulse is above or below the preselected frequency of the compensating pulse supplied by the generator 84 and a magnitude depending on the extent of the frequency variation of the compensating echo with reference to the preselected frequency of the compensating pulse. This frequency variation is determined by the amount of the relative motion between the observing point and the reflecting object. This direct-current voltage is utilized to energize a motor 82 in such sense that the motor armature is rotated either in a clockwise or a counter-clockwise direction, depending on the polarity of the direct-current voltage, and in such sense that the amount of the armature rotation is in proportion to the magnitude of the direct-current voltage. This armature rotation operates a phase shifter 83 whereby delay is added to the echo of the signal pulse to compensate for the change in distance between the observing point and reflecting object as the latter recedes from the observing point or whereby delay is subtracted from the echo of the signal pulse as the reflecting object approaches the observing point.

The arrangement of Fig. 2 may be substituted in Fig. 1 to the right of the line X—X so that a compensating wave of constant and preselected frequency which is different from that of the signal pulse supplied by generator 70a, is continuously transmitted from source 85 via the transmitter 77 and sending apparatus 78. Variations in the frequency of the compensating echo, with reference to the preselected frequency of the compensating wave, are utilized to obtain a direct-current voltage which serves to vary the delay of the echoes of the signal pulses to compensate for relative motion between the observing point and reflecting object as explained previously regarding the corresponding compensating wave utilized in Fig. 1.

What is claimed is:

1. In combination with echo ranging apparatus for determining distance including means at an observing point for transmitting one portion of a signal pulse and receiving an echo from an object in its path, and means responsive to a further portion of the signal pulse and the echo for indicating the distance between said point and object, means at said point to vary the delay of the echo in a sense depending on the direction of relative motion between said point and object and to an extent depending on the amount of such relative motion, said last means being effective to cause the variation in the echo delay to compensate the distance indication for such relative motion for each of said echoes.

2. In combination with distance determining apparatus comprising means at an observing point for transmitting one portion of a signal pulse and receiving its echo, and means responsive to the echo and a further portion of the signal pulse for indicating the distance to an object causing the echo, means to compensate the distance indication for relative motion between said observing point and object, said last means comprising means at said point for transmitting a compensating pulse of preselected frequency and receiving its echo, and means responsive to frequency variations in the compensating echo, with reference to the preselected frequency, for varying the delay of echo of the signal pulse in a sense depending on the direction of the relative motion between said observing point and object, and to an extent depending on the amount of such relative motion whereby the distance indication is compensated for such relative motion for each distance-determining echo.

3. The combination according to claim 2 in which said compensating transmitting means is rendered inoperaitve during time intervals when said one signal portions are being transmitted, and is rendered operative at all other times.

4. The combination according to claim 2 in which said compensating transmitting means is continuously operative.

5. In combination with an echo ranging system comprising means at an observing point for transmitting one portion of a signal pulse of certain frequency and receiving its echo from an object in its path, and means responsive to said echo and a further portion of the signal pulse for indicating the distance between said point and object, means to compensate the distance indication for relative motion between said point and object, said compensating means comprising means at said point for transmitting a compensating pulse of preselected frequency during at least the time interval between the transmission of successive said one pulse portions, means for receiving the echo of said compensating pulse from said object, means for detecting the frequency variations in said compensating echo with reference to the preselected frequency of said compensating wave, said detecting means producing a direct-current voltage having a polarity depending on whether the frequency of the compensating echo is above or below the preselected frequency of said compensating wave and thereby depending on the direction of the relative motion between said point and object, said direct-current voltage having a magnitude proportional to the extent of such frequency variation and thereby proportional to the amount of such relative motion, and means controlled by said direct-current voltage to vary the delay of the distance-determining echo in a sense determined by the polarity of said last voltage and to an amount determined by the magnitude of said last voltage whereby the distance indication is compensated for the relative motion between said point and object for each distance-determining echo.

6. The combination according to claim 5 in which said compensating means comprises means at said one point for continuously transmitting said compensating pulse, both during the time interval of the transmission of said one pulse portions and during the time interval between successive said one pulse portions.

WILFRID L. DAWSON.